(12) United States Patent
Veeraraghavan et al.

(10) Patent No.: US 12,540,216 B2
(45) Date of Patent: Feb. 3, 2026

(54) TWO-COMPONENT MOISTURE CURABLE THERMAL INTERFACE MATERIAL FOR THERMAL MANAGEMENT SYSTEMS

(71) Applicants: Thanikaivelan Tindivanam Veeraraghavan, Newburgh, IN (US); Karthikeyan Sengotaiyan, Newburgh, IN (US); Senthilkumar Veeraraghavan, Newburgh, IN (US)

(72) Inventors: Thanikaivelan Tindivanam Veeraraghavan, Newburgh, IN (US); Karthikeyan Sengotaiyan, Newburgh, IN (US); Senthilkumar Veeraraghavan, Newburgh, IN (US)

(73) Assignee: Uniseal, Inc., Evansville, IN (US)

( * ) Notice: Subject to any disclaimer, the term of this patent is extended or adjusted under 35 U.S.C. 154(b) by 251 days.

(21) Appl. No.: 17/547,411

(22) Filed: Dec. 10, 2021

(65) Prior Publication Data
US 2023/0183425 A1    Jun. 15, 2023

(51) Int. Cl.
*C08G 77/08* (2006.01)
*C08L 83/04* (2006.01)
*C09J 175/04* (2006.01)
*H01L 23/373* (2006.01)

(52) U.S. Cl.
CPC .............. *C08G 77/08* (2013.01); *C08L 83/04* (2013.01); *C09J 175/04* (2013.01); *H01L 23/3736* (2013.01); *Y10T 428/31663* (2015.04)

(58) Field of Classification Search
CPC ........ C08G 77/08; C08L 83/04; C09J 175/04; H01L 23/3736
See application file for complete search history.

(56) References Cited

U.S. PATENT DOCUMENTS

| | | |
|---|---|---|
| 7,191,858 B2 | 3/2007 | Vanderwees et al. |
| 7,841,431 B2 | 11/2010 | Zhou |
| 8,117,857 B2 | 2/2012 | Kelty et al. |
| 8,322,029 B2 | 12/2012 | Campbell et al. |

(Continued)

FOREIGN PATENT DOCUMENTS

| | | |
|---|---|---|
| EP | 1797155 | 10/2015 |
| WO | WO 2009/129068 | 10/2009 |

(Continued)

OTHER PUBLICATIONS

Martoxide NPL reference, retrieved Dec. 1, 2022.*

(Continued)

*Primary Examiner* — Michael B Nelson
(74) *Attorney, Agent, or Firm* — King & Partners, PLC

(57) ABSTRACT

A two-part curable composition which cures to form a thermally conductive cured product, including: (a) a first part including: (1) at least one metal catalytic component for catalyzing the cure reaction; (2) a non-reactive diluent component; (3) a wetting agent component; (4) a filler component; (5) a rheology modifier component; and (6) a pigment component; and (b) a second part including: (1) at least one silane terminated polyurethane polymer; (2) a moisture scavenger; (3) a non-reactive diluent component; (4) a filler component; and (5) a wetting agent component, wherein at least one of the filler components of the first-part and the second-part comprises a thermally conductive filler.

3 Claims, 10 Drawing Sheets

(56) References Cited

U.S. PATENT DOCUMENTS

| | | | |
|---|---|---|---|
| 8,431,445 B2 | 4/2013 | Robert | |
| 8,587,945 B1 | 11/2013 | Hartmann et al. | |
| 9,048,009 B2 | 6/2015 | Xu et al. | |
| 9,070,958 B2 | 6/2015 | Obasih et al. | |
| 9,482,142 B2 | 11/2016 | Paetkau et al. | |
| 9,593,275 B2 | 3/2017 | Tang et al. | |
| 9,629,283 B2 | 4/2017 | Soong et al. | |
| 10,003,053 B2 | 6/2018 | Hartmann et al. | |
| 10,100,195 B2 | 10/2018 | Okamoto et al. | |
| 10,246,546 B2 | 4/2019 | Kramer | |
| 10,270,141 B2 | 4/2019 | Piggott et al. | |
| 10,301,422 B2 | 5/2019 | Kramer et al. | |
| 10,356,946 B2 | 7/2019 | Oguma et al. | |
| 10,407,533 B2 | 9/2019 | Kramer et al. | |
| 10,476,051 B2 | 11/2019 | Mardall et al. | |
| 10,607,859 B2 | 3/2020 | Stathakis et al. | |
| 11,142,037 B2 | 10/2021 | Kim et al. | |
| 11,207,939 B2 | 12/2021 | Johnston et al. | |
| 2002/0027027 A1 | 3/2002 | Skala | |
| 2005/0107499 A1* | 5/2005 | Georgeau | B32B 13/12 524/556 |
| 2005/0241865 A1 | 11/2005 | Varenne | |
| 2010/0233926 A1* | 9/2010 | Shin | C09J 9/00 524/556 |
| 2012/0238695 A1* | 9/2012 | Zander | C08G 18/10 524/588 |
| 2013/0011683 A1* | 1/2013 | Busman | C09D 133/04 428/480 |
| 2013/0136895 A1* | 5/2013 | Usui | B29C 48/91 428/141 |
| 2015/0258875 A1 | 9/2015 | Enomoto et al. | |
| 2020/0157361 A1* | 5/2020 | Student | C09D 175/04 |
| 2020/0392275 A1 | 12/2020 | Thiebes et al. | |
| 2021/0323866 A1 | 10/2021 | Scardigno et al. | |
| 2021/0395483 A1* | 12/2021 | Ma | C08K 3/22 |
| 2022/0073738 A1* | 3/2022 | Mennecke | C08K 3/22 |

FOREIGN PATENT DOCUMENTS

| | | |
|---|---|---|
| WO | WO 2013/186349 | 12/2013 |
| WO | WO 2016/105915 | 6/2016 |
| WO | WO 2017/052373 | * 12/2017 |
| WO | WO 2020/165288 | 8/2020 |

OTHER PUBLICATIONS

Evonik NPL document (Year: 2017).*
Apyral NPL reference, retrieved Mar. 22, 2023.*
BYK NPL document, retrieved Jun. 21, 2024.*
PCT Written Opinion of the International Searching Authority for International Application No. PCT/US22/051163 mailed Apr. 6, 2023.

* cited by examiner

TWO-COMPONENT MOISTURE CURABLE THERMAL INTERFACE MATERIAL FOR THERMAL MANAGEMENT SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

Thermal Interface Materials (TIMs) are used in various industries and applications based on their ability to carry heat away from key components. The dissipation of heat often creates a bottleneck for the performance of electronic devices, heat exchangers, and solar panels. The present invention relates to thermal interface elastomeric materials comprising particles of, for example, aluminum oxide, silicon nitride, aluminum nitride, boron nitride, graphite and carbon nanotubes, which are useful for heat dissipation components in electric vehicles. Enhancing the thermal conductivity and minimizing the environmental impact of these products through the utilization of materials and polymers is critical to the success of these applications.

There are numerous applications where thermal management is needed, such as aerospace, automotive, electronics, mechatronics, and photonics. Thermal interface materials are employed for functional sheets, integrated circuit (IC) packaging, heat sinks, electrical power appliances, tapes, thermal gap pads, thermal gap fillers, encapsulation compounds, adhesives, grease, sealing materials, coatings, sulfur hexafluoride ($SF_6$) gas circuit breakers, solar panels and so forth.

2. Background Art

Automobile and vehicle manufacturers today are striving to meet and exceed global competition by achieving higher fuel economy standards. The fuel standards have been generally imposed for health and environmental reasons, stemming from the emissions of vehicles. In order to meet these goals, automobile and vehicle manufacturers have developed various solutions. The most basic, yet most profound, difference is to change how vehicles operate. Internal combustion engines (ICE) have powered vehicles for over 100 years, but the burning of fossil fuels has taken its toll on the environment. Manufacturers have worked consistently to improve engine and power train technology to make ICE burn cleaner and power vehicles further. New fuel and power alternatives are being sought, with electric vehicles (EV) being the evident successor to ICE transportation.

Other solutions, which can apply to all ICE, hybrid, or electric vehicles, include lower rolling resistance tires, better vehicle aerodynamics, and reduced overall vehicle weight. The reduction of vehicle weight has taken many approaches. These include incorporating new manufacturing and design techniques toward more efficient structures and use of materials, reducing the number of individual parts of a vehicle, integrating both lower density and lighter weight materials, redesigning parts to reduce their weight, and down-sizing the vehicle and/or its individual components. The parts and components of various vehicles have been made from aluminum, synthetic materials (e.g., plastic), composites and other lightweight materials. Many advancements have been made throughout the design of an entire vehicle, but new importance is being given to light-weight battery packs and thermal components.

Thermal management is critical in every aspect of the electronics space, such as battery packs, integrated circuits (IC), light-emitting diode (LED), power electronics, displays and photovoltaics. Advances in the electronics industry have made thermal management an increasingly important consideration, particularly with respect to packaging issues. For instance, heat build-up in electronic products leads to reduced reliability ("mean-time-to-failure"), slower performance, and reduced power-handling capabilities. In addition, continued interest in increasing the number of electronic components on, and reducing the size of semiconductor chips, generally to reduce power consumption contributes to the importance of thermal management. Also, chip-on-board technology, where semiconductor chips are mounted directly to printed circuit boards (PCB), creates further demands for thermal management because of the more efficient use of surface area (i.e., greater real estate density on the PCB).

In conventional electronic equipment, heat-dissipating members, typically heat sinks in the form of metal plates of aluminum or copper having a high heat conductivity, are used for suppressing a temperature rise of heat-generating components during operation. The heat-dissipating member conducts the heat generated by the components and releases the heat from the member's surface by virtue of a temperature difference from the ambient air. For efficient conduction of the heat generated by the components to the heat-dissipating member, it is effective to fill a small gap between the component and the member with a heat conductive material. The heat conductive materials used include thermal interface materials and heat conductive grease laden with heat conductive fillers. Such a heat conductive material is interposed between the heat-generating component and the heat-dissipating member, thereby establishing a direct path for heat conduction. These materials prevent degradation of the components and protect them from performance degradation or premature failure.

Typically these thermal interface materials are filled with metallic fillers, such as, silver or inorganic fillers (e.g., aluminum nitride or boron nitride). Silver flakes are used when maximum thermal conductivity and electrical conductivity are required, as it increases the thermal conductivity of the base polymer approximately 2-5 watts per meter-kelvin (W/m·K), depending on the loading. Drawbacks of using silver are the expense of the metal and that high weight percentages of silver are required (e.g., 95% by weight is used in some thermal interface materials) to achieve the desired performance levels, making the cost substantial. Aluminum nitride or boron nitride fillers also increase the thermal conductivity of the base polymer approximately 2-5 W/m·K, based on the filler loading, geometry and size. However, similarly to silver, high weight percentages of inorganic fillers are also required and are relatively expensive as well. The high loading levels and high-density metal powders that are used in these conventional thermal interface material fillers make a final product density above 3.5 g/cc.

When used in medium and large devices such as automobiles and power storage devices, a large number of battery cells may be electrically connected to each other to increase capacity and output, thereby forming a battery module or a battery pack.

In order to configure a battery module or a battery pack in which a plurality of such battery modules are connected, various fastening parts or cooling equipment are required. Such fastening parts or cooling equipment causes an increase in the manufacturing cost of the battery module or the battery pack, along with increase in volume and weight with reduced output.

It is known to use thermal interface materials filled with aluminum oxide and aluminum tri-hydrate for the purpose of making thermal conductive interface material. The lower density and filler level of these materials achieve a comparable level of conductivity (2-2.2 W/m·K) while reducing the final product density to 2-2.2 g/cc.

The battery pack reduces approximately 30% in weight by using this low density material. The material has low viscosity causing low application pressure and the material to be flowable. Low abrasion of the material leads to less equipment maintenance (e.g., seals, tips, etcetera) which saves time and cost. Reducing the weight of the battery pack is essential in EV because lighter weight equates to an extended battery range.

Silicone-based thermal interface materials served as an early thermal interface material for electronic assemblies. This thermal interface material is formed by dispersing thermally conductive ceramic fillers in silicone to form a paste. Also, silicone-based thermal interface materials exhibit the disadvantage of causing silicone contamination of a wave solder bath. If silicone oil migrates onto a printed circuit board, any solder re-work on the board will not adhere. Such migration may also cause short circuits on the board. Due to paint defects observed in the automotive process, there is very limited use of silicone-based adhesive in battery module. Automotive manufacturers prefer not to use silicone products due to the possible effects on the paint shop. Polyurethane based solutions with isocyanate cure have health and hazardous concerns, as well as, they are not user and/or environmentally friendly. Epoxy based solutions have undesirable exothermic reactions, outgassing, and flexibility high glass transition temperature.

Silane terminated polyurethane (STP) polymer crosslinked by moisture in presence of metal catalyst system was developed to address many of the above-discussed issues when using other chemistries.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a two-part curable composition which cures to form a thermally conductive cured product, comprising, consisting essentially of and/or consisting of: (a) a first part comprising: (1) at least one metal catalytic component for catalyzing the cure reaction; (2) a non-reactive diluent component; (3) a wetting agent component; (4) a filler component; (5) a rheology modifier component; and (6) a pigment component; and (b) a second part comprising: (1) at least one silane terminated polyurethane polymer; (2) a moisture scavenger; (3) a non-reactive diluent component; (4) a filler component; and (5) a wetting agent component, wherein at least one of the filler components of the first-part and the second-part comprises a thermally conductive filler.

In a preferred embodiment of the present invention, the weight ratio of the first-part to the second-part is approximately 1:1 by volume.

In another preferred embodiment of the present invention, the composition cures in between approximately (i.e., +/−10%) 10 and approximately 240 minutes from the time the first-part and the second-part are brought together at room temperature.

In yet another preferred embodiment of the present invention, the first-part and second-part comprise a pre-cured viscosity ranging from approximately 75 to approximately 1,000 pascal-second.

In one preferred embodiment of the present invention, the first-part and second-part comprise a pre-cured density of approximately 2.0 to approximately 3.2 grams per cubic centimeter.

In another aspect of the present invention, the two-part curable composition preferably cures to form a cured product with a Shore 00 durometer hardness ranging from approximately 50 to approximately 98.

In a preferred embodiment of the present invention, the two-part curable composition cures to form a cured product with a thermal conductivity ranging from approximately 2.0 to approximately 5.0 watts per meter-kelvin.

In another preferred embodiment of the present invention, the two-part curable composition cures to form a cured product that after 12 weeks of environmental exposure cycles (80° C. heat cycle/80° C. with 80% relative humidity cycle) exhibits little or no change from initial thermal conductivity.

In yet another preferred embodiment of the present invention, the two-part curable composition cures to form a cured product that has a flammability rating of V-0 under UL94 standard.

In an additional embodiment of the present invention, the two-part curable composition cures to form a cured product that has a minimum dielectric strength of 8 kV/mm.

In one preferred embodiment of the present invention, the one or more metal catalytic components of the first-part is present from approximately 0.1 percent to approximately 0.5 percent by weight of the total weight of the first-part.

In a preferred embodiment of the present invention, silane terminated polyurethane polymer of the second-part is present from approximately 2 percent to approximately 15 percent by weight of the total weight of the second-part.

In another preferred embodiment of the present invention, the silane terminated polyurethane polymer of the second-part comprises a pre-cured average molecular weight ranging from approximately 4,000 Daltons to approximately 8,000 Daltons, a pre-cured viscosity ranging from approximately 5,000 centipoise to approximately 7,500 centipoise, and a pre-cured density of approximately 1.0.

In yet another preferred embodiment of the present invention, the thermally conductive filler is present from approximately 40 percent to approximately 95 percent by weight of the total weight of the first-part, the second-part and/or the first- and second-parts.

In one preferred embodiment of the present invention, the wetting agent component of the first-part is present from approximately 0.1 percent to approximately 5.0 percent by weight of the total weight of the first-part.

In a preferred embodiment of the present invention, the wetting agent component of the second-part is present from approximately 0.1 percent to approximately 5.0 percent by weight of the total weight of the second-part.

In another preferred embodiment of the present invention, the pigment component of the first-part is present from approximately 0.1 percent to approximately 2.0 percent by weight of the total weight of the first-part.

In yet another preferred embodiment of the present invention, the non-reactive diluent component of the first-part is present from approximately 2 percent to approximately 15 percent by weight of the total weight of the first-part and the second-part. In this embodiment, the non-reactive diluent component of the first-part preferably comprises at least one of an isopropylated triphenyl phosphate, a butylated triphenyl phosphate, an isopropylated triaryl phosphate, a tris-chloropropyl phosphate, and combinations or mixtures thereof.

In one preferred embodiment of the present invention, the moisture scavenger of the second-part is present from approximately 0.1 percent to approximately 5.0 percent by weight of the total weight of the second-part.

In a preferred embodiment of the present invention, the rheology modifier component of the first-part is present from approximately 0.1 percent to approximately 5.0 percent by weight of the total weight of the first-part.

In another preferred embodiment of the present invention, the thermally conductive filler comprises aluminum oxide, aluminum tri-hydrate, boron nitride, graphene nano plate, and/or aluminum nitride. In this embodiment the average particle size of the thermally conductive filler ranges from approximately 10 to approximately 200 micrometers.

The present invention is also directed to a thermally conductive cured product formed using the two-part curable compositions disclosed herein.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
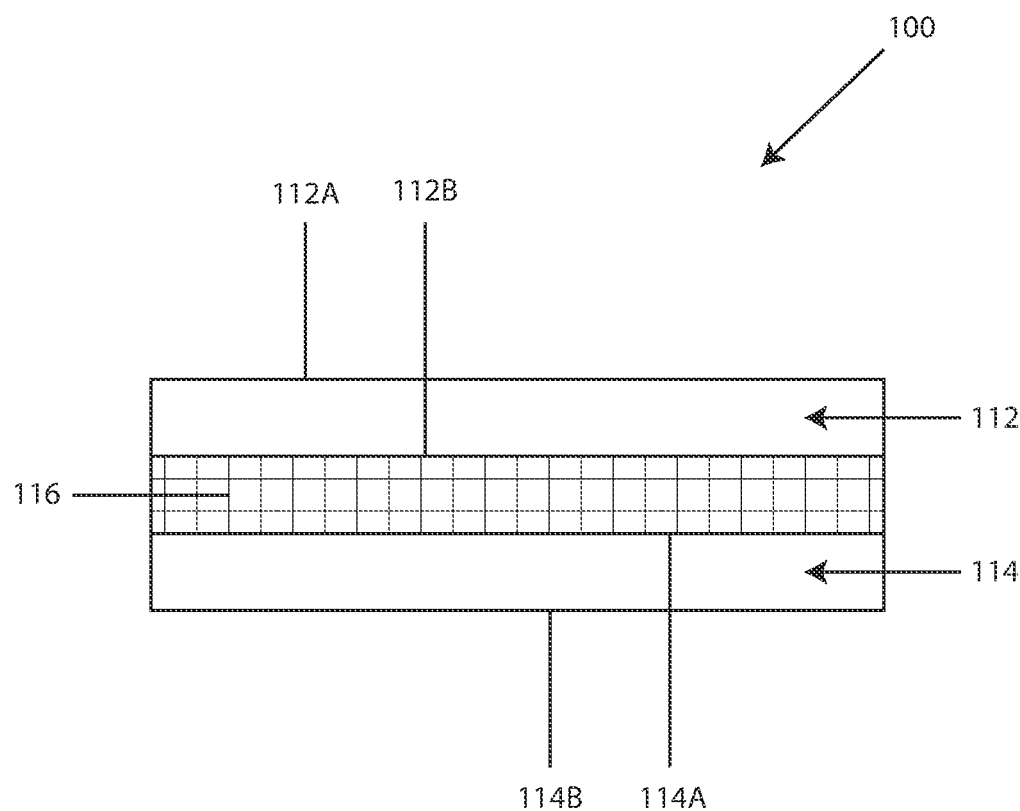
Figure 2:
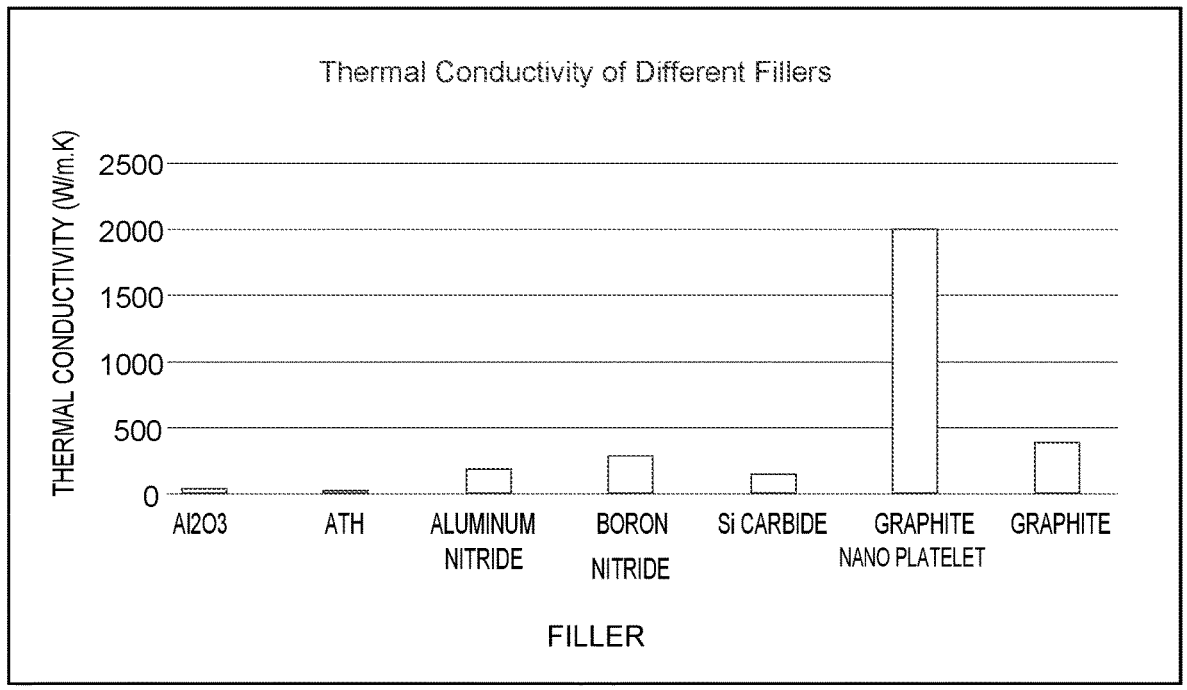
Figure 3:
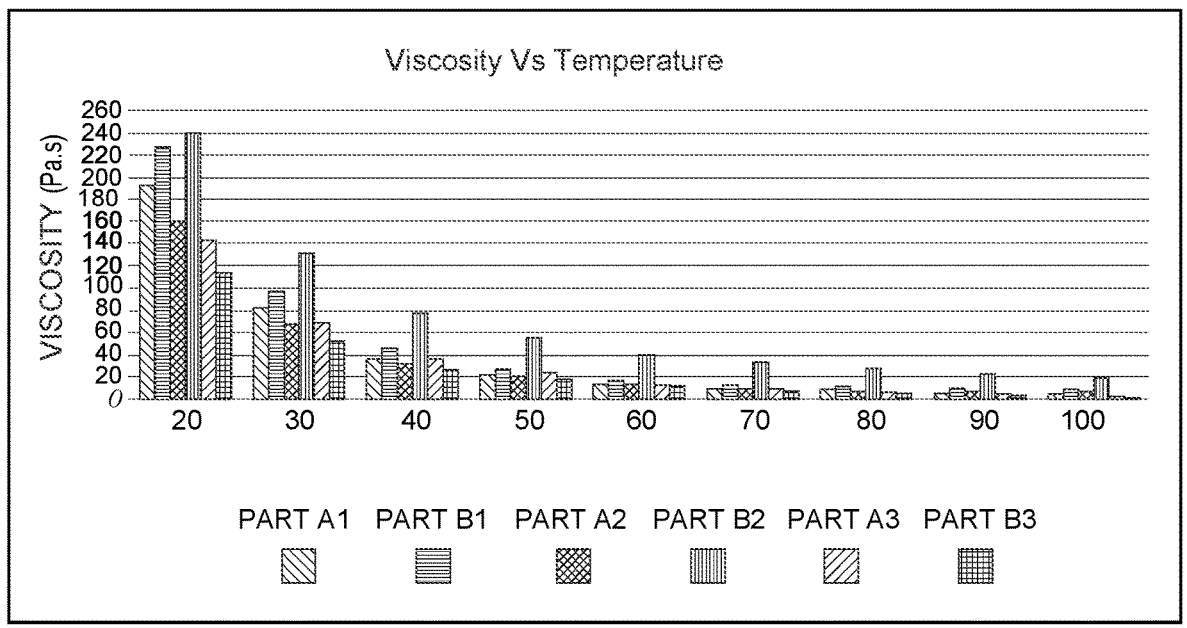
Figure 4:
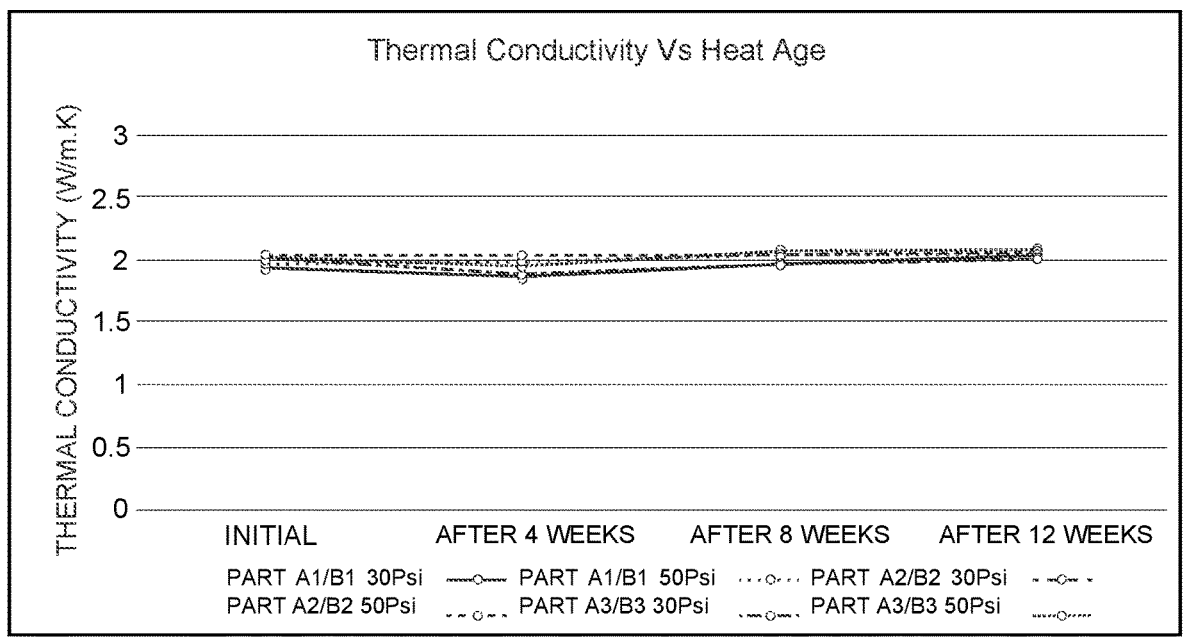
Figure 5:
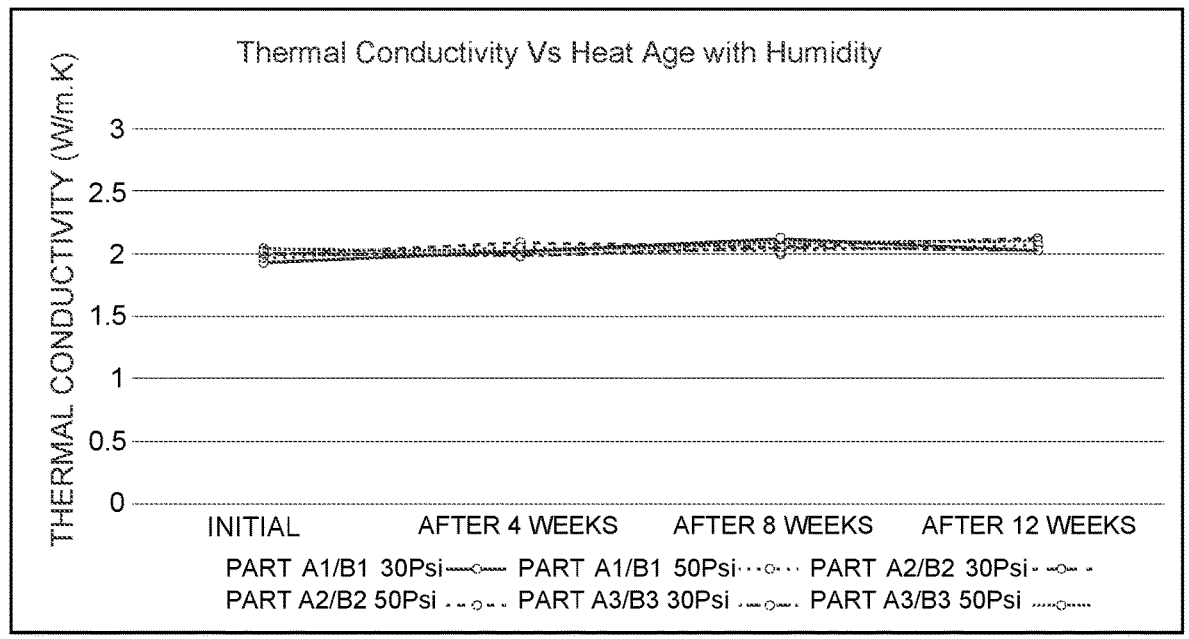
Figure 6:
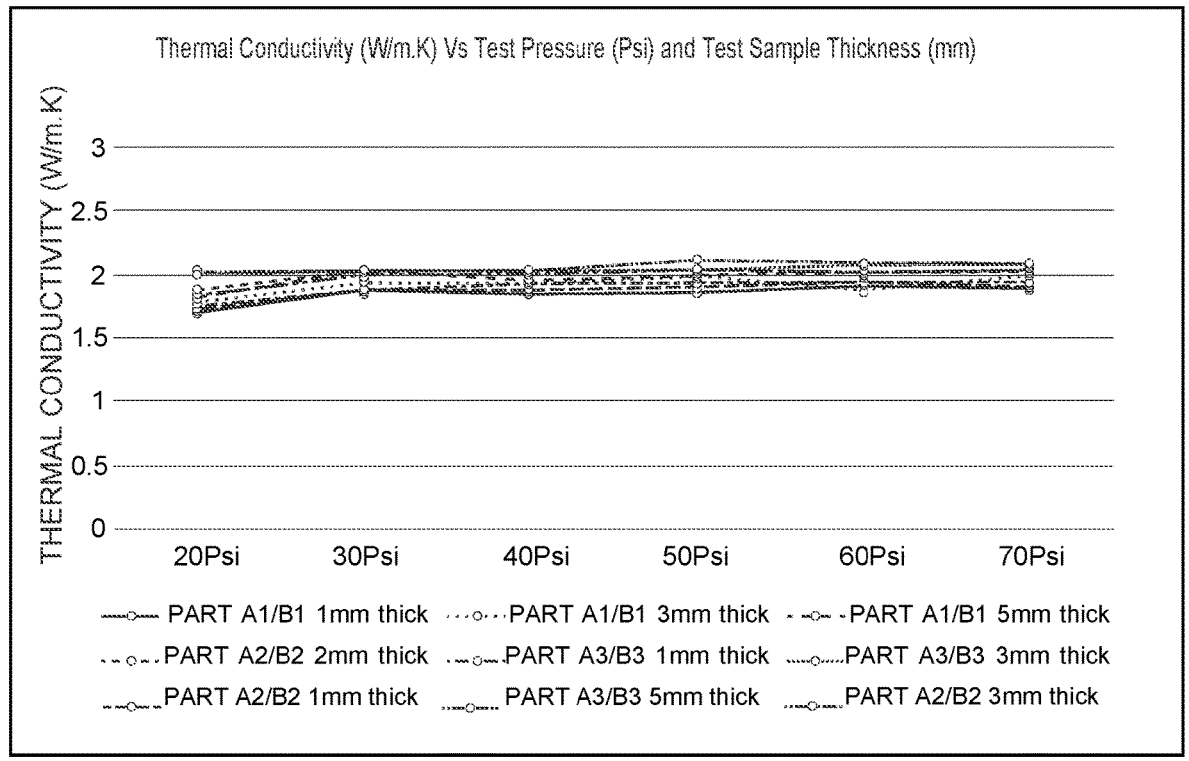
Figure 7:
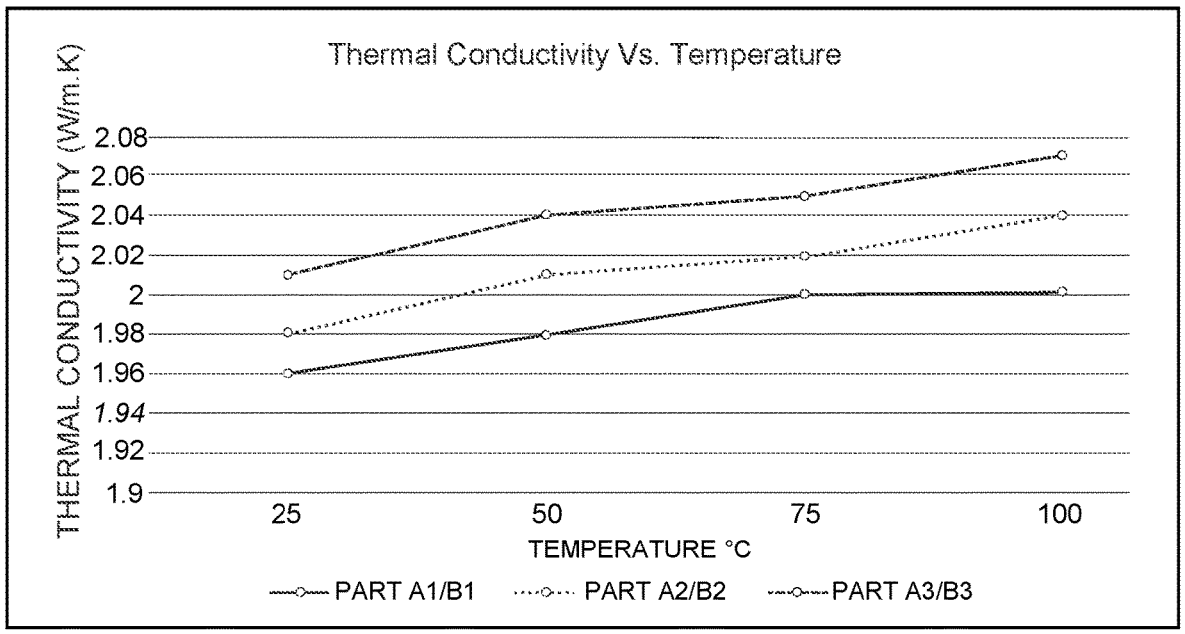
Figure 8:
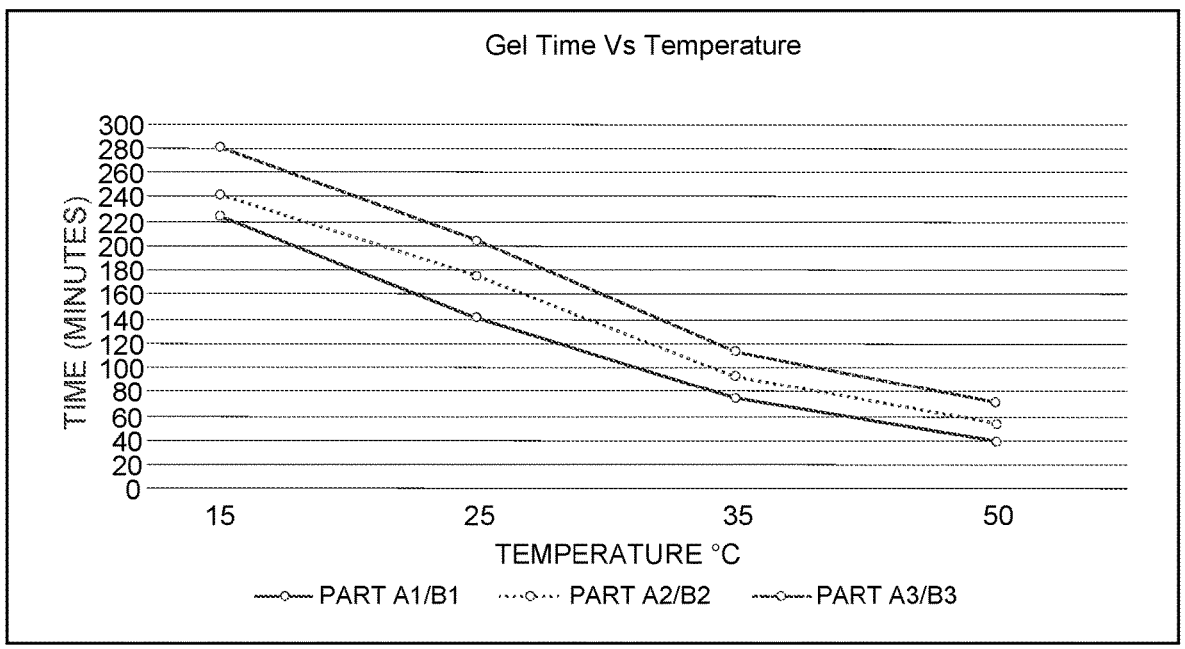
Figure 9:
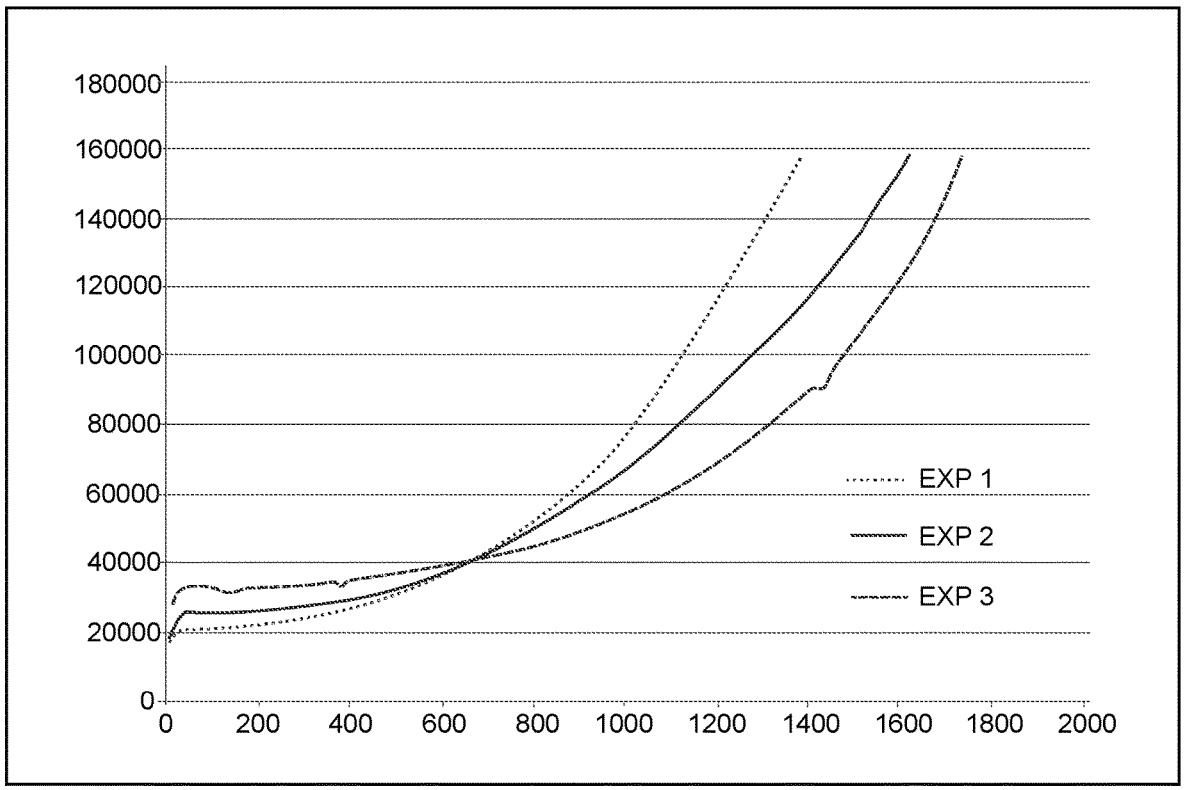
Figure 10:
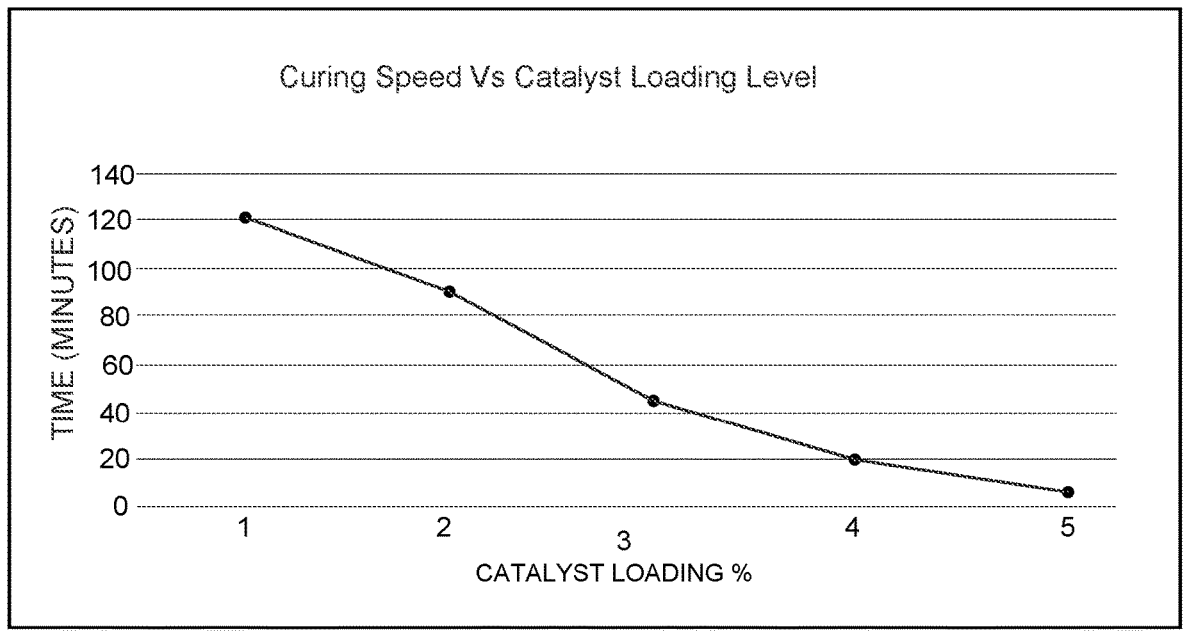

The invention will now be described with reference to the drawings wherein:

FIG. 1 of the drawings is a cross-sectional schematic representation of a component assembly (e.g., EV battery pack) associated with a thermally conductive cured product (e.g., thermal gap filler) in accordance with the present invention;

FIG. 2 of the drawings is a two-dimensional plot showing the thermal conductivity of a plurality of filler materials;

FIG. 3 of the drawings is a two-dimensional plot showing viscosity as a function of temperature;

FIG. 4 of the drawings is a two-dimensional plot showing thermal conductivity as a function of time (heat aged);

FIG. 5 of the drawings is a two-dimensional plot showing thermal conductivity as a function of time (heat aged with humidity);

FIG. 6 of the drawings is a two-dimensional plot showing thermal conductivity as a function of pressure;

FIG. 7 of the drawings is a two-dimensional plot showing thermal conductivity as a function of temperature;

FIG. 8 of the drawings is a two-dimensional plot showing gel time as a function of temperature;

FIG. 9 of the drawings is a two-dimensional plot showing the curing profile for a plurality of experiments; and FIG. 10 of the drawings is a two-dimensional plot showing curing speed as a function of catalyst concentration.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

As will be discussed and shown experimentally hereinbelow, the present invention is directed to unique, two-part curable compositions which cure to form thermally conductive cured products. The compositions of the present invention are useful for bonding heat generating components, such as, for example, automotive electrical battery pack components, high-capacity batteries and electric motors in electric and hybrid vehicles.

Referring now to the drawings, and to FIG. 1 in particular, component assembly 100 is shown, which generally comprises first substrate 112 having first surface 112A and second surface 112B, second substrate 114 having first surface 114A and second surface 114B, and thermally conductive cured product 116. It will be understood that component assembly 100 may comprise, for illustrative purposes only, a heat sink, electrical component, a sub-assembly or part of an automotive electrical battery pack, high-capacity battery and/or an electric motor in an electric and/or hybrid vehicle. Indeed, the thermally conductive cured products of the present invention are suitable for a plurality of applications.

First substrate 112 may be fabricated from any one of a number of materials, such as, for example, steel, steel electrogalvanized with zinc, steel hot dipped galvanized with zinc, aluminum, metal alloys, d-block metals, and combinations thereof. First substrate 112 may also be fabricated from, for example, borosilicate glass, soda lime glass, float glass, natural and synthetic polymeric resins, plastics, and/or composites including Topas®, which is commercially available from Ticona of Summit, New Jersey. First substrate 112 is preferably fabricated from a sheet having a thickness ranging from approximately 0.25 mm to approximately 5.00 mm, and more preferably ranging from approximately 0.75 mm to approximately 2.50 mm. It will be understood, that unless specified otherwise, the term approximately, as used herein, will be defined as the value, number, and/or integer +/−10 percent. Of course, the thickness of the substrate will depend largely upon the particular application of the assembly. While particular substrate materials have been disclosed, for illustrative purposes only, it will be understood that numerous other substrate materials are likewise contemplated for use—so long as the materials exhibit appropriate physical properties, such as strength, to be able to operate effectively in conditions of intended use. Indeed, substrate assemblies in accordance with the present invention can be, during normal operation, exposed to extreme temperature variation, as well as substantial UV radiation, emanating primarily from the sun.

Second substrate 114 may be fabricated from similar and/or dissimilar materials as that of first substrate 112. As such, second substrate 114 may comprise polymers, metals, glass, and ceramics—to name a few. Second substrate 114 is preferably fabricated from a sheet having a thickness ranging from approximately 0.25 mm to approximately 5.00 mm, and more preferably ranging from approximately 0.75 mm to approximately 2.50 mm.

As will be discussed herein below, thermally conductive cured product 116 is preferably formed from a two-part curable composition comprising: a first part comprising: (1) at least one metal catalytic component for catalyzing the cure reaction; (2) a non-reactive diluent component; (3) a wetting agent component; (4) a filler component; (5) a rheology modifier component; and (6) a pigment component; and a second part comprising: (1) at least one silane terminated polyurethane polymer; (2) a moisture scavenger; (3) a non-reactive diluent component; (4) a filler component; and (5) a wetting agent component, wherein at least one of the filler components of the first-part and the second-part comprises a thermally conductive filler.

component are used in thermal conductive potting formulations to provide excellent hydrophobicity, low temperature ductility, retention of properties during thermal cycling and low embedment stress properties. Through a combination of ease of handling, superior electrical insulating properties, no exotherm while curing and excellent stability in hot and humid environments.

Preparation of polymers isocyanate functional prepolymers having organic backbones are well known. Organic backbone polymer systems include acrylics, polyurethanes, polyethers, polyesters, polyolefin and others. Inorganic backbone systems are exemplified by poly organo-siloxanes. Preferred polymers have an organic backbone, especially a polyurethane backbone or a polyether backbone. Depending on the application, any such prepolymers may be used in preparing moisture curable silylated polymers by end capping with a silane of formula alternatively, the silanes may be reacted with mono isocyanates which are then used to prepare polymers to yield pendant alkoxy silane functionalities.

Room-temperature curable isocyanate terminated polyurethane polymers whose terminal isocyanate groups have been reacted with a silane monomer having at least one dialkoxy silane group and an organo-functional group with at least one active hydrogen to form a silane terminated polyurethane polymer. In the presence of a metal catalyst, the silane terminated polyurethane polymer cures with moisture. The crosslinked STP polymer backbone with low modulus and soft segment results in low hardness and high flexibility properties.

Provided below are non-limiting examples of structural formulas for the silane terminated polyurethane polymer and precursors thereto:

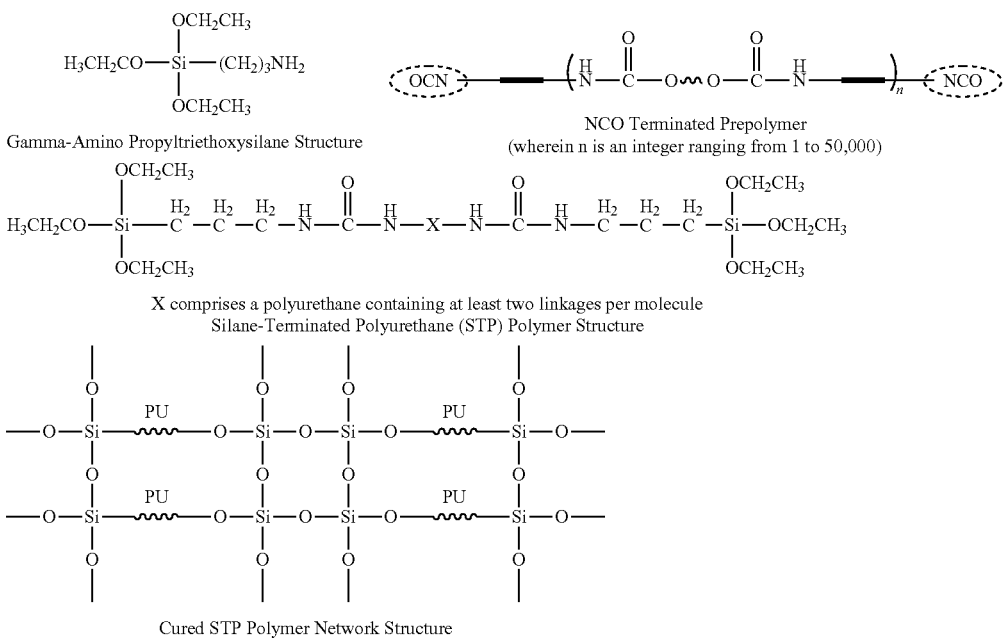

Components of the two-part curable composition of the present invention are provided below.

Base Polymers

Silane terminated polyurethane (STP) polymers crosslinked by moisture in the presence of metal catalyst, two Non-limiting examples of STP polymers for use in accordance with the present invention include, for example, those with the following characteristics: molecular weight of 4,000-8,000 Daltons, Viscosity 5,000-7,500 cps, and a density of approximately 1.00 g/cm³. By adjusting the base polyol functionality, the isocyanate chemistry and the silane chemistry molecular structure (e.g., linear or branched), the molecular weight and viscosity of the STP can be modified. Additional details regarding the STP polymers are disclosed in the experiments hereinbelow.

The STP polymer cures by metal catalyst with moisture removing ethanol by hydrolysis of silanol to form gel structures of various hardness. Equal stoichiometry is preferred to ensure all available functional groups are reacted to give the maximum crosslinking to ensure a tack free surface.

Catalysts

A catalyst is used to cure the silane terminated polyurethane polymers. Suitable catalysts are dialkyltin dicarboxylates, such as dibutyltin dilaurate and dibutyltin acetate, tertiary amines, the stannous salts of carboxylic acids, such as stannous octoate and stannous acetate, and the like. The preferred catalyst used in the present invention is stannous octoate.

Provided below are non-limiting examples of structural formulas for catalyst of the present invention:

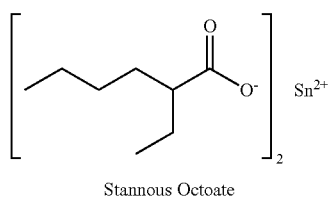
Stannous Octoate

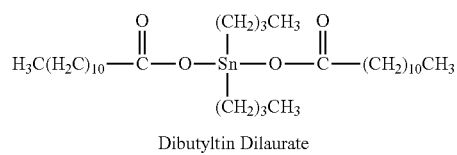
Dibutyltin Dilaurate

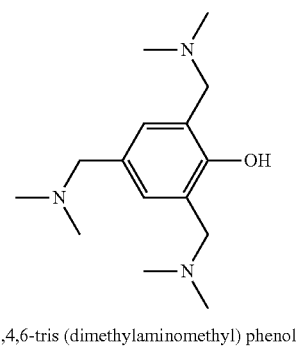
2,4,6-tris (dimethylaminomethyl) phenol

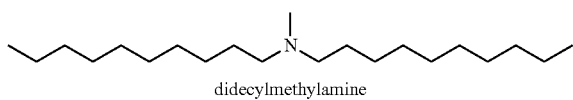
didecylmethylamine

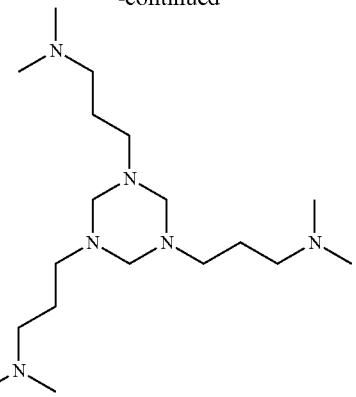
1,3,5-tris(3-(dimethylamino)propyl)hexahydro-s-triazine

Thermally Conductive Fillers

In general, thermal conductivity increases with increased conductive filler content. Thermal interface materials undergo a percolation transition where the thermal conductivity of the composite rapidly increases by several orders of magnitude and its nature changes from an insulator to a conductor. This behavior is attributed to the formation of a thermally conductive network throughout the insulating matrix material when the filler content is at or above the percolation threshold.

The present invention provides a thermal conductive composition including a base polymer material arranged to form a matrix and mixed with conductive particulate fillers. To form a conductive network, a conduction promoter is arranged to saturate a filler surface of the base material that is filled with conductive particulate fillers, where the conduction promoter is an immiscible wetting agent with an ultra-low particle filler volume fraction. A mixture of the base polymer material, conductive particulate fillers, and the immiscible wetting agent form a particle-filled polymeric suspension that undergoes capillary forces exerted by the immiscible wetting agent. Due to the capillary forces, capillary bridges are arranged between the conductive particulate fillers. Percolation of the particle-filled polymeric suspension and the presence of capillary bridges form a highly conductive network, enhancing the thermal conductivity of the material.

A wide range of different thermally conductive fillers may be used in exemplary embodiments of a thermal interface material according to the present disclosure. In preferred embodiments, the thermally conductive fillers have a thermal conductivity of at least 1.5 W/m·K (Watts per meter Kelvin) or more. Suitable thermally conductive fillers include, for example, boron nitride, alumina, aluminum tri-hydrate, graphite, ceramics, and combinations thereof (e.g., alumina and zinc oxide, etc.). In addition, exemplary embodiments of a thermal interface material may also include different grades (e.g., different sizes, different purities, different shapes, etc.) of the same (or different) thermally conductive fillers.

By varying the types and grades of thermally conductive fillers, the final characteristics of the thermal interface material (e.g., thermal conductivity, viscosity, gel time, flammability, hardness, etc.) may be varied as desired. Alumina-based fillers are the most cost-effective heat conductive materials. They are easy-to-use and designed to improve the co-existence of filler and matrix in thermally sensitive environments. They also allow the high loadings necessary to transfer heat away from the electronic part, and the resulting part has exceptional properties appropriate for thermal management of polymeric and resin compounds. In order to achieve high loads, the fillers are preferably compatible/adherent with the polymer matrix, and the final product should possess high mechanical strength. Alumina features specific particle shapes, fitted particle size distributions and optimized functional surface characteristics which are designed especially for electronic applications. The improved dispersibility of Alumina results in lower viscosities at high filler contents. Numerous applications also require the combination of electrical and thermal insulation. On account of its appropriate dielectric properties, in many cases alumina is the filler of choice for electrically or thermal insulating polymers. It is of specific interest because of its ability to decrease the coefficient of thermal expansion to limit shrinkage, improve heat distortion temperature, and impart high mechanical strength.

TABLE 1

(PROPERTIES OF THERMALLY CONDUCTIVE FILLERS)

| Properties (Units) | Al2O3 | ATH | ALN | BN | SiC | GNP | Graphite |
|---|---|---|---|---|---|---|---|
| Thermal Conductivity W/m · K | 28-35 | 20-25 | 170-220 | 300 | 150 | 2000 | 398 |
| Particle Size Distribution (µm) | 20-85 | 10-60 | 50-70 | 35-70 | 40-80 | 20-150 | 30-200 |
| Density (g/cm3) | 3.99 | 2.42 | 3.26 | 2.25 | 3.21 | 2.3 | 2.26 |
| Shape | Spherical | Plate-like | Needle | Hexagonal | Sharp Edged | Powder | Hexagonal Crystal Structure |
| BET Surface Area (m2/g) | 0.16 | 1.4 | 0.9 | <3.5 | 2.0 | 20-40 | 0.5 |

Table 1 above lists commercially available thermally conductive fillers and corresponding thermal conductive range. FIG. 2 of the drawings provides a two-dimensional plot showing the thermal conductivity for a plurality of filler materials.

Abbreviations

Al2O3— Aluminum oxide, ATH— Aluminum Tri-hydrate, ALN— Aluminum Nitride, BN— Boron Nitride, SiC— Silicon Carbide, and GNP— Graphene Nanoplatelet.

Non-Reactive Diluents//Solid/Liquid Flame Retardants

Aluminum trihydroxide (ATH) and magnesium dihydroxide (MDH) are two metal hydrates that are used to impart flame resistance. The metal hydrate releases water during thermal decomposition. During combustion, the released water absorbs heat volatilizes, and cools the burning material. The volatilized water dilutes the degradation products and oxygen at the surface of the material. Additionally, the metal hydrate becomes a metal oxide after dehydration which is nonflammable and insulates the part.

Flame retardant plasticizers based on phosphate esters effectively replace and avoid the use of the most flammable component, i.e. the plasticizer itself. Commonly available phosphate ester plasticizers are of three major types: triaryl phosphates, alkyl diaryl phosphates, and their mixtures. Although most phosphate ester plasticizers can be used as primary plasticizers, they are usually blended with lower costly phthalate ester plasticizers to obtain the desired performances at a minimum loading. The blend is preferred because they are significantly more expensive than standard plasticizers, and because they are characterized by poor low temperatures properties. They have the additional advantage of being non-pigmenting and hence clear flame retardant formulations can be obtained.

Flame retardancy is improved by flame retardants that cause the formation of a surface film of low thermal conductivity and/or high reflectivity that reduces the rate of heating (A). It is also improved by flame retardants that might serve as a heat sink by being preferentially decomposed at a low temperature (B). And finally, it is improved by flame retardant coatings that upon exposure to heat may intumesce into a foamed surface layer with low thermal conductivity properties.

Phosphate ester plasticizers were among the first flame retardant additives actively used in elastomeric materials. Thermal and electrical insulation products, obtained using phosphate esters as plasticizers. Nowadays, phosphate ester plasticizers are used as primary flame retardants in flexible formulations. They also find use in the preparation of flexible films, sheeting, and other significant applications where flame test requirements cannot be met with the usual inorganic flame retardant products. The flame-retardant plasticizer improving the flame retardancy is not particularly limited as long as it enhances the flame-retardant effect. Preferably, examples of flame retardant plasticizer for elastomeric material application include isopropylated triphenyl phosphate, butylated triphenyl phosphate (BPP), isopropylated triphenyl phosphate, tris(chloropropyl)phosphate (TCPP), cresyl diphenyl phosphate (CDP), tris (1,3-dichloro-2-propyl) phosphate (TCP), resorcinol diphenyl phosphate (RDP), and bisphenol A diphenyl phosphate (BDP).

There are other several general phthalate plasticizers that are used for non-reactive diluents. Among them, the most commonly used are: diisononyl phthalate (DINP), diisodecyl phthalate (DIDP), diisoundecyl phthalates (DIUP), and diisoheptyl phthalate (DIHP).

Provided below are non-limiting examples of structural formulas for non-reactive diluents and flame retardants of the present invention:

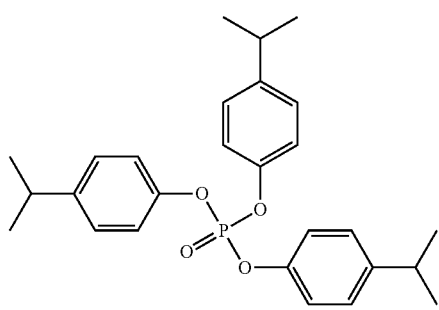

isopropylated triphenyl phosphate

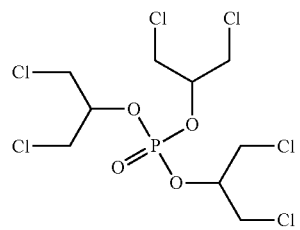

tris (1,3-dichloro-2-propyl) phosphate

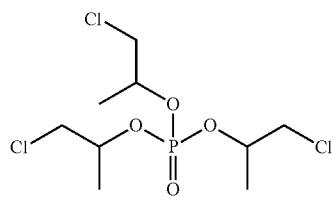

tris (chloropropyl) phosphate (TCPP)

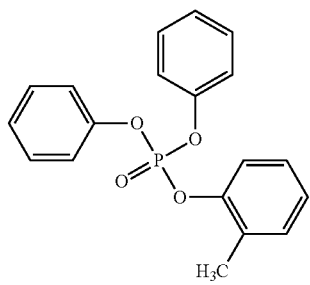

cresyl diphenyl phosphate

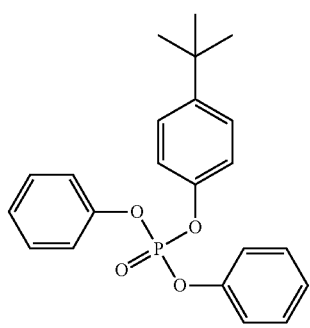

butylated triphenyl phosphate

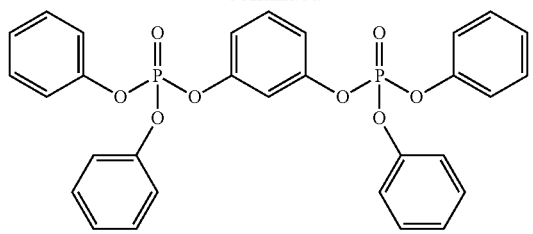

resorcinol diphenyl phosphate (RDP)

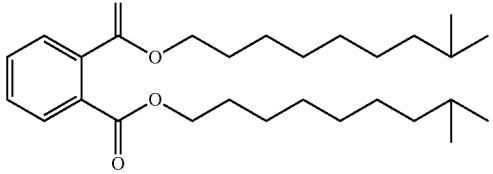

diisodecyl phthalate (DIDP)

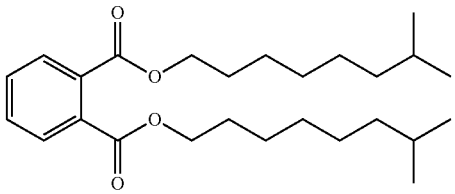

diisononyl phthalate (DINP)

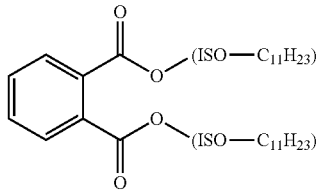

diisoundecyl phthalates (DIUP)

Wetting Agents/Process Additives

Wetting agents/process additives/dispersing agents of the present invention are preferably oligomers or polymers which stabilize dispersions of pigments and fillers against flocculation. Suitable wetting agents are preferably selected for polymer and filler matrix to wet out effectively. The additives improve the wetting and dispersing of all inorganic fillers. The additives provide lower viscosity and enable higher filler loading. Preferably wetting agents of the present invention include, for example, commercially available Tego Disperse 755 W, 741 W, 653,670,652,656 and BYK Disperbyk 111,108,118,199. One preferred wetting agent used in the present invention is Disperbyk 111 due to its strong viscosity reduction character.

Moisture Scavengers

In accordance with the present invention, silanes used as drying agents can capture any latent moisture present in the immediate environment or filler in the thermal interface material system. This moisture absorption capability helps to increase the shelf life of the stored product and to prevent any premature cure by avoiding the reaction between moisture and the active groups in the material. One preferred moisture scavenger is vinyl trimethoxysilane.

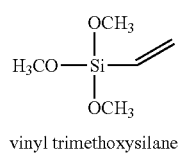

vinyl trimethoxysilane

Due to the electron interaction of the vinyl group, the Si—methoxy group in this silane hydrolyzes substantially faster than in saturated aliphatic alkylaoxysilanes. Any moisture inherently present in the formulation is removed by the methoxy groups hydrolyze and the vinyl silane condenses.

Molecular sieves are crystalline metal aluminosilicates with a three-dimensional interconnected silica and alumina tetrahedra network. Natural hydration water is heated away from this network to produce homogeneous cavities that selectively adsorption molecules of a specific size. Molecular sieves are synthetic zeolite materials designed with precise and uniform structure and size pores. This also provides absorption of gases and liquids, preferably based on molecular size and polarity. Zeolites are naturally existing, highly porous crystal solids belong to the class of chemicals known as alumina silicates.

A 4 to 8-mesh sieve is normally used in gas phase applications, while the 8 to 12-mesh type is common in liquid phase applications. The powder forms of the 3A, 4A, 5A and 13X sieves are suitable for specialized applications.

Rheological Additives

In accordance with the present invention, rheology modifiers are vital additives used in almost every thermal interface material to achieve desired rheological characteristics for the particular application. Apart from getting desired viscosity, these additives also help in shelf-stability, ease of application, open time/wet-edge and sagging. Fumed silica, fumed alumina, bentonite clay, liquid rheological additives, and multi-mineral clays are preferred rheological modifiers.

Pigments

In accordance with the present invention, the two-part curable composition preferably includes one or more pigments. The pigments may include non-elemental pigments and elemental pigments, such as, but not limited to, cadmium pigments (e.g., cadmium yellow, cadmium red, cadmium green, cadmium orange, cadmium sulfoselenide, etcetera), chromium pigments (e.g., chrome yellow and chrome green (viridian)), cobalt pigments (e.g., cobalt violet, cobalt blue, cerulean blue, aureolin (cobalt yellow)), copper pigments (e.g., azurite, han purple, han blue, egyptian blue, malachite, paris green, phthalocyanine blue BN, phthalocyanine green, verdigris) iron oxide pigments (e.g., sanguine, caput mortuum, oxide red, red ochre, yellow ochre, venetian red, prussian blue, raw sienna, burnt sienna, raw umber, burnt umber), lead pigments (e.g., lead white, cremnitz white, naples yellow, red lead, lead-tin-yellow), manganese pigments (e.g., manganese violet, YInMn blue), mercury pigments (e.g., vermilion), titanium pigments (e.g., titanium yellow, titanium beige, titanium white, titanium black), zinc pigments (e.g., zinc white, zinc ferrite, zinc yellow), aluminum pigment (e.g., aluminum powder), carbon pigments (e.g., carbon black (including vine black, lamp black), ivory black (bone charcoal)), and ultramarine pigments (e.g., (based on sulfur) ultramarine, ultramarine green shade).

The invention is further described by additional examples and experiments hereinbelow.

In this example, two-component dispensable thermal interface material mixture according to the present invention comprising a first-part and a second-part were prepared as follows:

The first part of the thermal conductive composition was prepared using the components.

TABLE 2

(BASE BLEND A1-B3)

| Common name | Grade name | Chemical name |
| --- | --- | --- |
| Base Blend A1-A3 | | |
| liquid flame retardant/plasticizer | Disflamoll 51092 | butylated triphenyl phosphate ester |
| solid rheological additive | Aeroxide Alu C | fumed aluminum oxide |
| wetting agent | Disperbyk-111 | copolymer with acidic groups |
| carbon black | Raven Carbon black | carbon black |
| metal catalyst | Kosmos T9 | stannous octoate |
| Base Blend B1-B3 | | |
| STP polymer | Polymer ST61LV | base polymer |
| solid rheological additive | Aeroxide Alu C | fumed aluminum oxide |
| diluent | Jayflex DINP | phthalate plasticizer |
| wetting agent | Disperbyk-111 | copolymer with acidic groups |
| moisture scavenger | Dynasylan VTMO | vinyl silane |

Base Blend— A1

In separate vessel Base blend A1 mixture is formed by blending of 78.80 grams of liquid flame retardant, 6.83 grams of wetting agent, 6.85 grams of metal catalyst, 6.82 grams of solid rheological additive and 0.70 grams of carbon black then mixed with nitrogen for 10 minutes at 15 rpm.

Base Blend— A2

In separate vessel Base blend A2 mixture is formed by blending of 78.80 grams of liquid flame retardant, 10.25 grams of wetting agent, 6.85 grams of metal catalyst, 3.40 grams of solid rheological additive and 0.70 grams of carbon black then mixed with nitrogen for 10 minutes at 15 rpm.

Base Blend— A3

In separate vessel Base blend A3 mixture is formed by blending of 77.10 grams of liquid flame retardant, 12 grams of wetting agent, 6.90 grams of metal catalyst, 3.40 grams of solid rheological additive and 0.70 grams of carbon black then mixed with nitrogen for 10 minutes at 15 rpm The second part of the thermal conductive composition was prepared using the components.

Base Blend—B1

In separate vessel Base blend B1 mixture is formed by blending of 43.10 grams of STP polymer, 6.72 grams of wetting agent, 47.14 grams of diluents, 2.72 grams of liquid rheological additive and 0.32 grams of moisture scavenger then mixed with nitrogen for 10 minutes at 15 rpm.

Base Blend—B2

In separate vessel Base blend B2 mixture is formed by blending of 43.10 grams of STP polymer, 9.4 grams of wetting agent, 44.46 grams of diluents, 2.72 grams of liquid rheological additive and 0.32 grams of moisture scavenger then mixed with nitrogen for 10 minutes at 15 rpm.

Base Blend—B3

In separate vessel Base blend B3 mixture is formed by blending of 43.10 grams of STP polymer, 8.06 grams of wetting agent, 45.80 grams of diluents, 2.72 grams of liquid rheological additive and 0.32 grams of moisture scavenger then mixed with nitrogen for 10 minutes at 15 rpm.

Mixing Procedure:

Exp A making:

Purge mixing vessel 5 min with nitrogen, then add Base Blend A and thermal conductive fillers then mix with nitrogen for 10 minutes at 15 rpm then mix without nitrogen for 20 minutes at 30 rpm then scrape the blades and can. Then mix with nitrogen for 2 minutes at 60 rpm then mix for 60 minutes at 60 rpm with vacuum. Check viscosity if the viscosity is in the range then scrape the blades and bowl. Mix with nitrogen for 5 minutes at 15 rpm in reverse. Then mix for 60 minutes at 15 rpm in reverse with vacuum. Check final viscosity. Then package.

Record mixing vessel Temp, Material Temp, Facility Temp and Humidity.

Exp B making:

Purge mixing vessel 5 min with nitrogen, then add Base Blend B and thermal conductive fillers then mix with nitrogen for 10 minutes at 15 rpm then mix without nitrogen for 20 minutes at 30 rpm then scrape the blades and can. Then mix with nitrogen for 2 minutes at 60 rpm then mix for 60 minutes at 60 rpm with vacuum. Check viscosity if the viscosity is in the range then scrape the blades and bowl. Mix with nitrogen for 5 minutes at 15 rpm in reverse. Then mix for 60 minutes at 15 rpm in reverse with vacuum. Check final viscosity. Then package.

Record mixing vessel Temp, Material Temp, Facility Temp and Humidity.

Individual Viscosities of Experiments A and Experiments B measured by plate to plate rheometer (TA Instruments—AR 2000) (40 mm plate, 1000 micron gap, 2.4 shear rate, 23±1° C.).

Experiments A viscosities ranges between 100-1000 Pa·s.
Experiments A densities ranges between 2.00-3.02 g/cm3.
Experiments B viscosities ranges between 75-1000 Pa·s.
Experiments B densities ranges between 2.00-3.02 g/cm3.

After Experiments A and Experiments B are made and filled then mixed when dispensed through a dynamic mixing 1:1 ratio by volume, they are used for the tests. The cure chemistry of this composition is such that good green strength (Gel time) occurs between 10-240 minutes after dispensing at ambient temperature (23±1° C.). Full cure has taken place between 24-72 hours at ambient temperature. All the tests on the cured samples run after 72 hours.

Thermal conductivity in accordance with described ASTM D5470-12 Method. The thermal conductivity measured (Analysis Tech-TIM tester 1400) different test pressures, different temperatures and different test sample thickness described according test tables.

Apart from the thermal conductivity and the mechanical properties of the thermal interface material composition, other features have also to be taken into account, such as the process ability, Especially the curability of the thermal interface material has to be adapted for the respective applications. R was surprisingly found that the mechanical properties of the inventive thermal interface materials are advantageously balanced when the mixing ratio of component A to component B is within a certain range. Therefore, an embodiment of the present invention is preferred wherein the nixing ratio by weight of component A to component B is 1:1.

In order to be process in industrial application the composition needs to have a viscosity that allows easy and precise application therefore an embodiment is preferred wherein the composition according to the invention has a viscosity of no more than 1,500 Pa·s, preferably no more than 1,000 Pa·s, in particular 50 to 200 Pa·s, determined at 23° C.

Commonly, the thermal conductivity of a composition is achieved at the costs of the adhesive and mechanical properties of the material. It was surprisingly found that the inventive cured thermal interface materials not only exhibits excellent thermal conductivity and good flexibility.

TABLE 3

| Mixer/Raw materials | Exp 1 | | Exp 2 | | Exp 3 | |
|---|---|---|---|---|---|---|
| | Part A1 | Part B1 | Part A2 | Part B2 | Part A3 | Part B3 |
| Base Blend A | 15 | | 15 | | 15 | |
| Base Blend B | | 19 | | 19 | | 19 |
| Aluminum oxide Particle size 22-85 (μm) | 45 | 31 | 45 | 31 | 45 | 31 |
| Aluminum tri hydrate Particle size 10-60 (μm) | 40 | 50 | 40 | 50 | 40 | 50 |

Preparing Combinations

Exp. 1 Mixer of A1 and Mixer of B1 are mixed when dispensed through a dynamic mixing 1:1 ratio by volume used for testing.

Exp. 2 Mixer of A2 and Mixer of B2 are mixed when dispensed through a dynamic mixing 1:1 ratio by volume used for testing.

Exp. 3 Mixer of A3 and Mixer of B3 are mixed when dispensed through a dynamic mixing 1:1 ratio by volume used for testing.

TABLE 4

| | Mixed Properties | | | | | | | | | |
|---|---|---|---|---|---|---|---|---|---|---|
| | Viscosity (Pa·s) | | Density (g/cm3) | | | | | Thermal | Dielectric strength (IEC | |
| Exp # | Part A | Part B | Part A | Part B | Mix | Gel time (minutes) | Hardness (shore 00) | conductivity (W/m·K) | 62631-3-1) kV/mm | Flammability UL 94-V0 |
| Exp 1 | 148 | 157 | 2.07 | 2.18 | A1/B1 | 140 | 78 | 1.98 | 8.00 | Pass |
| Exp 2 | 172 | 94 | 2.10 | 2.17 | A2/B2 | 180 | 70 | 2.02 | 8.25 | Pass |
| Exp 3 | 117 | 80 | 2.10 | 2.16 | A3/B3 | 210 | 65 | 2.04 | 8.60 | Pass |

Viscosities and densities are measured @ 23±1° C.

Hardness and T=thermal conductivity test sample thickness are 3±0.1 mm and cured @ 23±1° C. for 72 hours then performed tests.

Dielectric strength and flammability test sample thickness are 1±0.1 mm and cured @ 23±1° C. for 72 hours then performed tests.

Temperature Vs Viscosity.

As can be seen in FIG. 3, viscosity varies with temperature. FIG. 3 shows a chart of the viscosity of each component at different temperatures. As you can see, the viscosity decreases as temperature increases. In practical terms a material that has been kept at low temperature (0-15° C.) may be difficult to dispense but once it has warmed up to normal room temperature around 25° C. it can be more easily dispensable.

Viscosity was measured by TA Instruments— AR 2000 (plate-to-plate Rheometer: 40 mm plate, 1000 micron gap, 2.4 shear rate)

TABLE 5

| S. No | Temperature ± 1° C. | Viscosity (Pa · s) | | | | | |
|---|---|---|---|---|---|---|---|
| | | Part A1 | Part B1 | Part A2 | Part B2 | Part A3 | Part B3 |
| 1 | 20 | 193.7 | 239.8 | 227.8 | 143 | 159.5 | 113.7 |
| 2 | 30 | 81.94 | 131 | 97.34 | 68.54 | 67.37 | 52.47 |
| 3 | 40 | 37 | 77.81 | 45.32 | 36.07 | 31.36 | 27.2 |
| 4 | 50 | 21.92 | 55.54 | 27.03 | 23.02 | 19.37 | 18.01 |
| 5 | 60 | 13.39 | 40.47 | 16.54 | 13.52 | 12.15 | 11.3 |
| 6 | 70 | 9.61 | 33.08 | 12.31 | 8.93 | 9.09 | 7.85 |
| 7 | 80 | 6.81 | 27.73 | 10.62 | 5.61 | 7.27 | 4.98 |
| 8 | 90 | 5.17 | 22.55 | 9.62 | 3.31 | 6.15 | 2.94 |
| 9 | 100 | 4.31 | 18.13 | 8.63 | 2.01 | 5.41 | 1.74 |

TABLE 6

(ENVIRONMENT EXPOSURE EFFECT ON THERMAL CONDUCTIVITY (TEST SAMPLE THICKNESS 3 ± 0.1 MM))

| EXP # | Sample test pressure (Psi) | Thermal conductivity (W/m · K.) | | | | | |
|---|---|---|---|---|---|---|---|
| | | | Heat cycle 80° C. | | | Humidity Cycle 80° C. with 80% Rh | |
| | | Initial | After 4 weeks | After 8 weeks | After 12 weeks | After 4 weeks | After 8 weeks | After 12 weeks |
| Exp 1 | 30 | 1.94 | 1.86 | 1.95 | 2.01 | 2.0 | 2.01 | 2.02 |
| | 50 | 1.98 | 1.98 | 2.02 | 2.05 | 2.01 | 2.02 | 2.04 |
| Exp 2 | 30 | 2.00 | 1.90 | 1.95 | 2.04 | 2.05 | 2.05 | 2.08 |
| | 50 | 2.02 | 2.03 | 2.04 | 2.08 | 2.07 | 2.08 | 2.12 |
| Exp 3 | 30 | 2.02 | 1.89 | 1.95 | 2.02 | 2.01 | 2.03 | 2.03 |
| | 50 | 2.04 | 1.95 | 2.06 | 2.08 | 2.03 | 2.09 | 2.1 |

FIG. 4 shows the effect of storage at elevated temperature condition (80° C.) on Thermal conductivity. Cured samples are exposed at elevated temperature condition (80° C.) then the samples are tested the intervals of 4, 8 and 12 weeks and the thermal conductive test was done at two different test pressures (30 psi, 50 psi) with 3 mm thickness, 25 mm diameter sample. Thermal conductive test temperature is 50° C.

FIG. 5 shows the effect of storage at elevated temperature condition (80° C.) with 80% of relative humidity on Thermal conductivity. Cured samples are exposed at elevated temperature condition (80° C.) with 80% of relative humidity then samples are tested the intervals of 4, 8 and 12 weeks and the thermal conductive test was done at two different test pressures (30 psi, 50 psi) with 3 mm thickness, 25 mm diameter sample. Thermal conductive test temperature is 50° C.

TABLE 7

(TEST PRESSURE (PSI) VS. THERMAL CONDUCTIVITY (W/m · K))

| EXP # | Sample thickness (mm) | Test pressure/Thermal conductivity (W/m · K) | | | | | |
|---|---|---|---|---|---|---|---|
| | | 20 psi | 30 psi | 40 psi | 50 psi | 60 psi | 70 psi |
| Exp 1 | 1.0 | 1.71 | 1.86 | 1.86 | 1.86 | 1.89 | 1.89 |
| | 3.0 | 1.79 | 1.94 | 1.92 | 1.98 | 1.87 | 2.01 |
| | 5.0 | 1.81 | 1.98 | 1.95 | 1.98 | 1.99 | 2.03 |
| Exp 2 | 1.0 | 1.75 | 1.88 | 1.9 | 1.9 | 1.92 | 1.94 |
| | 3.0 | 1.85 | 2.0 | 2.0 | 2.02 | 2.02 | 2.04 |
| | 5.0 | 1.88 | 2.02 | 2.04 | 2.02 | 2.06 | 2.08 |

TABLE 7-continued (TEST PRESSURE (PSI) VS. THERMAL CONDUCTIVITY (W/m · K))

| EXP # | Sample thickness (mm) | Test pressure/Thermal conductivity (W/m · K) | | | | | |
|---|---|---|---|---|---|---|---|
| | | 20 psi | 30 psi | 40 psi | 50 psi | 60 psi | 70 psi |
| Exp 3 | 1.0 | 1.76 | 1.88 | 1.92 | 1.94 | 1.94 | 1.96 |
| | 3.0 | 2.0 | 2.02 | 2.02 | 2.04 | 2.06 | 2.08 |
| | 5.0 | 2.01 | 2.03 | 2.04 | 2.1 | 2.08 | 2.08 |

FIG. 6 of the drawings shows thermal conductivity as a function of pressure.

Combination of Exp. 1 cured sample thermal conductivity was tested at different test pressure (20, 30, 40, 50, 60.70 psi) and different sample thickness (1 mm, 3 mm and 5 mm) and high-test pressure (50 psi to 70 psi), thermal conductivity results increase gradually.

Combination of Exp. 2 cured sample thermal conductivity was tested at different test pressure (20, 30, 40, 50, 60, 70 psi) and different sample thickness (1 mm, 3 mm and 5 mm) and high-test pressure (50 psi to 70 psi), thermal conductivity results increase gradually.

Combination of Exp. 3 cured sample thermal conductivity was tested at different test pressure (20, 30, 40, 50, 60, 70 psi) and different sample thickness (1 mm, 3 mm and 5 mm) and high-test pressure (50 psi to 70 psi), thermal conductivity results increase gradually.

Test temperature was in test analysis 50° C.
Test temperature vs Thermal conductivity

TABLE 8

(TEST SAMPLE THICKNESS 3.0 ± 0.1 MM, TEST SAMPLE DIAMETER 25 MM AND TEST PRESSURE 50 PSI)

| EXP # | Thermal conductivity (W/m · K)/Test temperature | | | |
|---|---|---|---|---|
|  | 25° C. | 50° C. | 75° C. | 100° C. |
| Exp 1 | 1.96 | 1.98 | 2.0 | 2.0 |
| Exp 2 | 1.98 | 2.01 | 2.02 | 2.04 |
| Exp 3 | 2.01 | 2.04 | 2.05 | 2.07 |

FIG. 7 of the drawings shows thermal conductivity as a function of temperature.

Cured material tested at constant sample thickness 3 mm, constant test pressure 50 psi and different test temperatures for thermal conductivity. The test temperature (25-100T) did not substantially affect thermal conductivity as the values stays largely unchanged.

TABLE 9

(TEMPERATURE VS GEL TIME)

| S. No | Temperature (° C.) | Gel time (Minutes) | | |
|---|---|---|---|---|
|  |  | Exp 1 | Exp 2 | Exp 3 |
| 1 | 18 | 220 | 240 | 280 |
| 2 | 25 | 140 | 180 | 210 |
| 3 | 35 | 80 | 100 | 120 |
| 4 | 50 | 40 | 60 | 80 |

FIG. 8 of the drawings shows gel time as a function of temperature.

FIG. 9 shows the curing profile curve comparisons for Exp. 1, Exp. 2, and Exp. 3 @ 50° C. This test conducted Brookfield HBD3TCP with the following parameters: Spindle: CPA52z, temperatures 50° C., multipoint every 5 s, start torque~-0.1%, speed 0.5 rpm, shear rate 1 1/sec endpoint 30 min.

FIG. 10 of the drawings shows curing speed as a function of catalyst concentration. When catalyst loading level is higher curing time is lower (faster cure). This study is based on Exp. 1 Mixer of A1 and Mixer of B1 combinations.

TABLE 10

(EXPERIMENTAL COMBINATIONS FOR THERMAL CONDUCTIVITY 2-5 W/m · K.)

| Mixer/Raw materials | Exp 4 | | Exp 5 | | Exp 6 | |
|---|---|---|---|---|---|---|
|  | A4 | B4 | A5 | B5 | A6 | B6 |
| Base Blend A3 | 15 |  | 10.1 |  | 6.5 |  |
| Base Blend B3 |  | 19 |  | 11.5 |  | 5.5 |
| Aluminum oxide Particle size 22-85 (μm) | 45 | 31 | 89.9 | 88.5 | 5 | 5 |
| Aluminum tri hydrate Particle size 10-60 (μm) | 40 | 50 |  |  |  |  |
| BN Particle size 35-70 (μm) |  |  |  |  | 29.5 | 29.5 |
| GNP Particle size 20-150 (μm) |  |  |  |  | 14 | 13 |
| ALN Particle size 50-70 (μm) |  |  |  |  | 45 | 47 |
| Viscosity (Pa · s) | 117 | 80 | 300 | 460 | 720 | 825 |
| Density (g/cm3) | 2.10 | 2.16 | 3.09 | 3.06 | 3.1 | 3.08 |
| Gel time (Minutes) | 210 |  | 40 |  | 30 |  |
| Hardness (Shore 00) | 65 |  | 90 |  | 96 |  |

TABLE 10-continued (EXPERIMENTAL COMBINATIONS FOR THERMAL CONDUCTIVITY 2-5 W/m · K.)

| Mixer/Raw materials | Exp 4 | | Exp 5 | | Exp 6 | |
|---|---|---|---|---|---|---|
|  | A4 | B4 | A5 | B5 | A6 | B6 |
| Thermal conductivity (W/m · K) | 2 ± 0.1 | | 3 ± 0.1 | | 5 ± 0.1 | |
| Dielectric strength (kV/mm) | 8.6 | | 12.1 | | 14.3 | |
| Flammability—UL 94 V-0 | Pass | | Pass | | Pass | |

Viscosity measured by TA Instruments— AR 2000 Plate to plate Rheometer: 40 mm plate, 1000 micron gap, 2.4 shear rate).

Hardness and thermal conductivity test sample thickness are 3±0.1 mm and cured @ 23±1° C. for 72 hours then performed testing.

Dielectric strength and flammability test sample thickness are 1±0.1 mm and cured @ 23±1° C. for 72 hours then performed testing.

Exp. 4 Mixer of A3 and Mixer of B3 are mixed when dispensed through a dynamic mixing 1:1 ratio by volume used for the tests. Gel time 210 minutes, hardness 65 (Shore 00), thermal conductivity 2±0.1 (W/m·K), dielectric strength 8.6 (kV/mm) and passed Flammability UL 94 test with V-0 rating (Table 10).

Exp. 5 Mixer of A4 and Mixer of B4 are mixed when dispensed through a dynamic mixing 1:1 ratio by volume used for the tests. Gel time 40 minutes, hardness 90 (Shore 00), thermal conductivity 3±0.1 (W/m·K), dielectric strength 12.1 (kV/mm) and passed Flammability UL 94 test with V-0 rating (Table 10).

Exp. 6 Mixer of A5 and Mixer of B5 are mixed when dispensed through a dynamic mixing 1:1 ratio by volume used for the tests. Gel time 30 minutes, hardness 96 (Shore 00), thermal conductivity 5±0.1 (W/m·K), dielectric strength 14.3 (kV/mm) and passed Flammability UL 94 test with V-0 rating (Table 10).

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A two-part curable composition which cures to form a thermally conductive cured product, comprising:
   a first part comprising: (1) a metal catalytic component for catalyzing the cure reaction, wherein the metal catalytic component is present from approximately 0.1 percent to approximately 0.5 percent by weight of the total weight of the first part and is

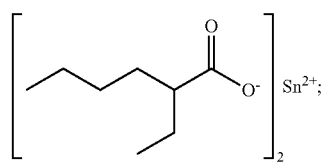

a non-reactive diluent component, wherein the non-reactive diluent component is

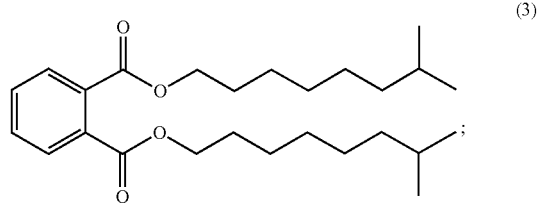 [SMILES: CC(C)CCCCCCOC(=O)c1ccccc1C(=O)OCCCCCCC(C)C]

a wetting agent component, wherein the wetting agent component is present from approximately 0.1 percent to approximately 5.0 percent by weight of the total weight of the first part and comprises a copolymer with acidic groups; (4) a filler component, wherein the filler component of the first part is present from approximately 40 percent to approximately 95 percent by weight of the total weight of the first part; (5) a rheology modifier component, wherein the rheology modifier component is present from approximately 0.1 percent to approximately 5.0 percent by weight of the total weight of the first part and comprises fumed aluminum oxide; and (6) a pigment component wherein the pigment component of the first part is present from approximately 0.1 percent to approximately 2.0 percent by weight of the total weight of the first part; and a second part comprising: (1) a silane terminated polyurethane polymer, wherein the silane terminated polyurethane polymer is present from approximately 2 percent to approximately 15 percent by weight of the total weight of the second part and is

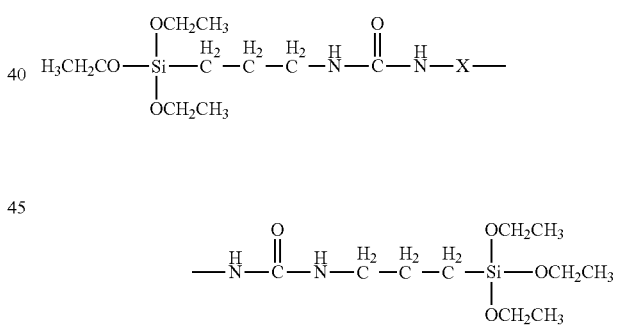

wherein X comprises a polyurethane linkage containing at least two polyurethane repeating units; (2) a moisture scavenger, wherein the moisture scavenger is present from approximately 0.1 percent to approximately 5.0 percent by weight of the total weight of the second part and is

a non-reactive diluent component, wherein the non-reactive diluent component is

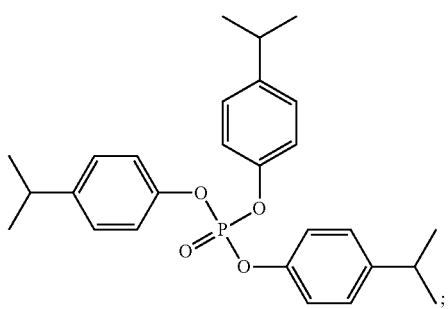

(4)

a filler component, wherein the filler component of the second part is present from approximately 40 percent to approximately 95 percent by weight of the total weight of the second part; and (5) a wetting agent component that is present from approximately 0.1 percent to approximately 5.0 percent by weight of the total weight of the second part, wherein at least one of the filler components of the first part and the second part comprises a thermally conductive filler selected from the group consisting of aluminum oxide, aluminum trihydrate, aluminum nitride, boron nitride, silicon carbide, and graphene nanoplatelet;

wherein the non-reactive diluent component of the first part and the non-reactive diluent component of the second part is present from approximately 2 percent to approximately 15 percent by weight of the total weight of the first part and the second part;

wherein the ratio of the first part to the second part is approximately 1:1 by volume;

wherein the composition gels in between approximately 10 and approximately 240 minutes from the time the first part and the second part are brought together at room temperature;

wherein the first part and second part comprise a pre-cured viscosity of approximately 75 to approximately 1,000 pascal-second at normal temperature and pressure;

wherein the first part and second part comprise a pre-cured density of approximately 2.0 to approximately 3.2 grams per cubic centimeter;

wherein the two-part curable composition cures to form a cured product with a Shore 00 durometer hardness ranging from approximately 50 to approximately 98;

wherein the two-part curable composition cures to form a cured product with a thermal conductivity ranging from approximately 3.0 to approximately 5.0 watts per meter-kelvin;

wherein the two-part curable composition cures to form a cured product that has a flammability rating of V-0 under UL94 standard; and wherein the two-part curable composition cures to form a cured product that has a minimum dielectric strength of 8 kV/mm.

2. The two-part curable composition of claim 1, wherein the thermally conductive filler comprises a combination of: (i) 45% by weight of the two-part curable composition of aluminum oxide having a particle size of 22-85 micrometers; and (ii) 40% by weight of the two-part curable composition of aluminum tri-hydrate having a particle size of 10-60 micrometers; and wherein the composition, after storage for 12 weeks at 80° C. with 80% relative humidity followed by curing, exhibits a thermal conductivity of at least 2.0 W/m·K.

3. The two-part curable composition of claim 1, wherein the thermally conductive filler comprises a combination of: (i) 29.5% by weight of the two-part curable composition of boron nitride having a particle size of 35-70 micrometers; (ii) 14% by weight of the two-part curable composition of graphene nanoplatelet having a particle size of 20-150 micrometers; and (iii) 45% by weight of the two-part curable composition of aluminum nitride having a particle size of 50-70 micrometers; wherein the composition, after curing, has a Shore 00 hardness of 96.

* * * * *